Oct. 24, 1933.  A. C. LINDGREN  1,932,112
REAR CULTIVATOR ATTACHMENT FOR TRACTORS
Filed Oct. 14, 1932

Inventor
Alexus C. Lindgren

Patented Oct. 24, 1933

1,932,112

UNITED STATES PATENT OFFICE 1,932,112

REAR CULTIVATOR ATTACHMENT FOR TRACTORS

Alexus C. Lindgren, Chicago, Ill., assignor to International Harvester Company, a corporation of New Jersey Application October 14, 1932. Serial No. 637,753

6 Claims. (Cl. 97—47)

This invention relates to tractor mounted implements and in particular to a straddle row cultivating attachment for mounting on the rear axle structure of row crop tractors of known types.

The principal object of the invention is to provide a cultivator attachment of strong but light construction adapted for mounting on the rear end of a row crop tractor and so suspended thereon as to provide vertical floating movement for both the attachment as a whole and for the individual tool beams thereof.

Another object is to provide a cultivator attachment using, as a component part thereof, the arched draw-bar present on row crop tractors of certain makes and forming therewith a two-row cultivator for operation on the soil in the interrow spaces traversed by the tractor wheels.

Other minor objects and advantages will be apparent from the detailed description hereinafter given of the structure embodying a preferred form of the invention.

Figure 1:
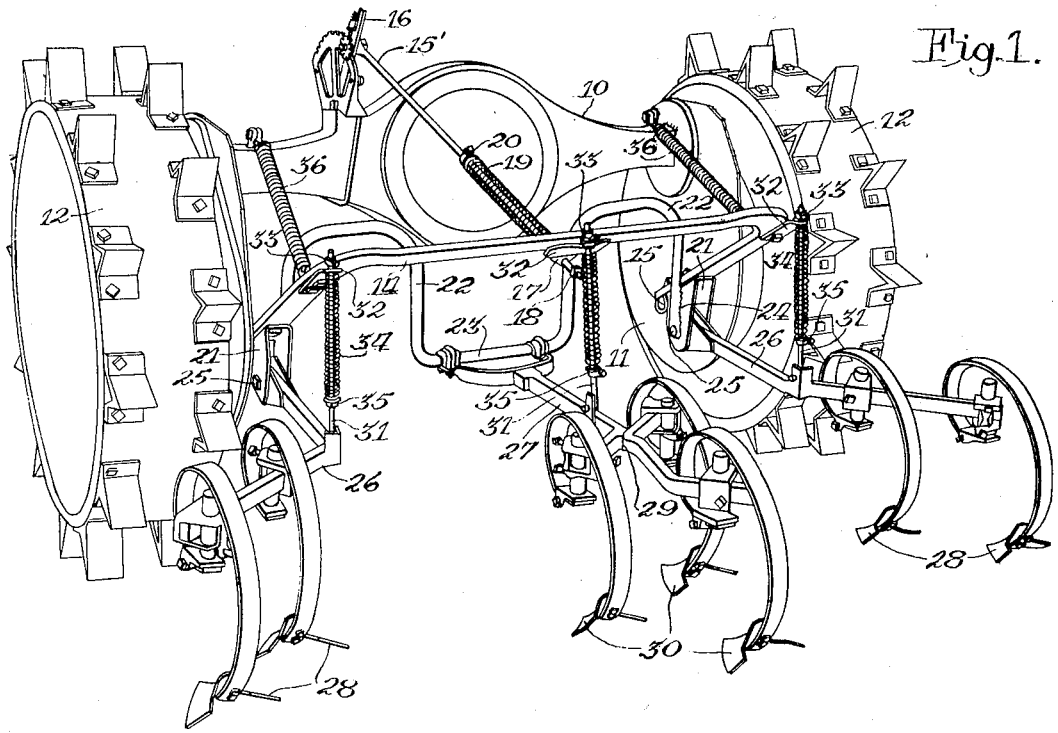
Figure 2:
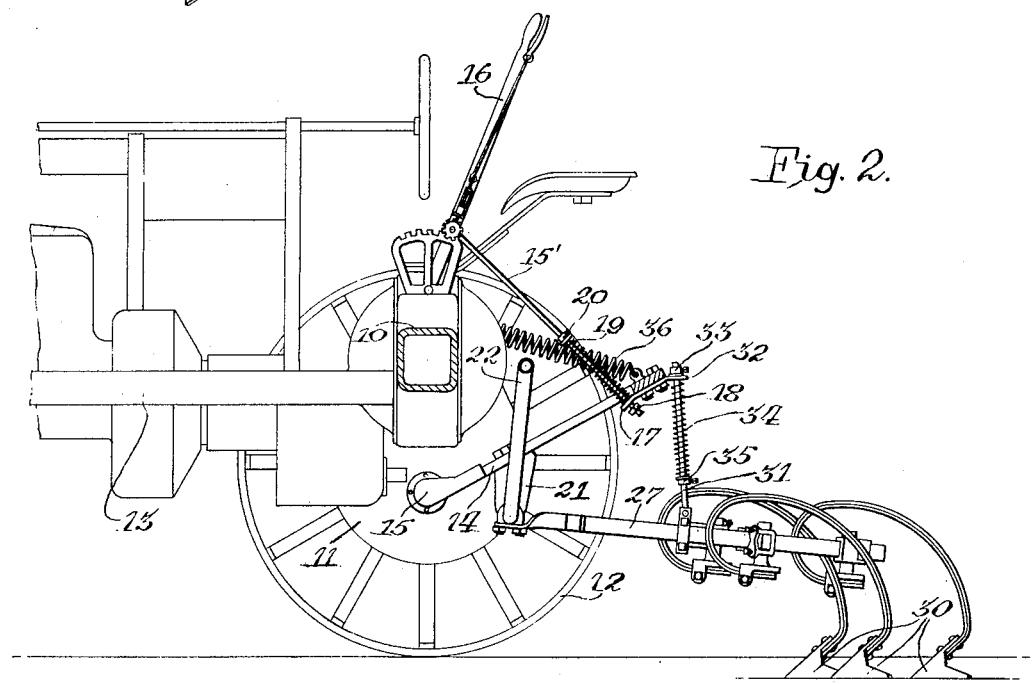

In the accompanying drawing:

Fig. 1 is a perspective view from the rear showing the rear axle structure of a tractor with the attachment mounted thereon, and Fig. 2 is a side elevation, partly in section.

In the present instance the cultivator attachment is shown in position on a row crop tractor comprising a wide tread rear axle structure formed of a transverse axle housing 10 and depending end housings 11 on the outsides of which the traction wheels 12 are mounted. The tractor has a central body 13 supporting the usual power plant and transmission line which body is supported at the front on a dirigible narrow tread truck (not shown).

Preferably, the attachment employs the draw-bar of the tractor, an arched rearwardly extending member 14, as its main frame. This arched, or U-shaped, bar has its arms pivotally supported at 15 on trunnions projecting from the inner surfaces of the end housings 11, and its rear transverse portion is adjustably supported from the axle structure by a link 15' connected to an adjusting lever 16 mounted on the axle housing adjacent the operator's station, or seat. At its rear end the link 15' passes freely through an apertured lug 17 secured to the member 14 and is provided with a stop nut 18 which engages the under side of the lug when the lever 16 is swung forward to swing the member 14 upward to lift the attachment. Above the lug 17 the link 15' carries a pressure spring 19, the upper end of which abuts a stop collar 20. The arched member 14 is thus provided with a lost motion connection with link 15' and can move upward against the yielding pressure of spring 19.

The arched member 14 forms the supporting frame for the cultivating gangs which, in the present instance, are disclosed as a two-row assembly. This assembly is mounted as a unit on the arched member. It consists of depending brackets 21 bolted to the undersides of the arms of the arched member and carrying a cross-bar formed with the upright arched portions 22 disposed on each side of the central line on the tractor, over the row spaces spanned by the axle structure, and connected by the intermediate straight portion 23.

The vertical ends or outer arms of the arched portions are welded, or otherwise secured, at 24 to the inner sides of the brackets 21 and the lower ends of the brackets carry transverse pins or pivot members 25 which are in effect horizontal outward extensions of the outer arms of the arches 22. The intermediate portion 23 of the cross bar and each of the pivot members 25 serve as places for pivotal connection of the tool carrying beams consisting of the outer beams 26 and the central beam 27 which are thus disposed in laterally spaced straddle-row relation. The outer beams are preferably formed with the rear portions thereof extending obliquely in an outward direction so as to dispose the shovels 28 thereon in the paths of the traction wheels. The central beam is preferably composed of two angularly related parts, or bars, welded together at 29 and arranged to provide three arms to which the spring standards of the central shovels 30 are mounted. Each of the tool beams is connected to the arched frame member 14 by a suspension and pressure link 31 pivoted at its lower end to a suitable ear or lug on the beam and at its upper end passing through an opening in a lug 32 secured to the member 14. Above these lugs each link has a stop nut 33, and below them the links carry coil springs 34 which are confined between the under sides of the lugs 32 and stop collars 35 adjustably secured on the respective links. Each beam is, therefore, yieldably pressed but may move upwardly independently of the others while the attachment as a whole may move or float upwardly against the pressure of spring 18. Suspension springs 36 between the axle and arched frame member may be provided to assist the lift and improve the floating movement of the attachment.

The construction, accordingly, is one in which the tool gangs readily accommodate themselves to varying levels of the ground surface and in which the parts are few and simple and adapted to be readily connected or disconnected from its supports on the tractor.

What is claimed is:

1. The combination with the rear axle structure of a row-crop tractor, of a rearwardly extending arched member with its arms pivotally connected to the axle structure on a transverse axis, means on the tractor for adjustably supporting said arched member, a cross bar connecting the arms of the arched member and formed with substantially upright arched portions located at each side of the central longitudinal line of the tractor and with a central horizontal portion connecting the arched portions, a trailing tool beam pivoted on the central horizontal portion of the cross-bar, and a yieldable supporting connection between the rear portion of the arched member and the tool beam.

2. The combination with the rear axle structure of a row-crop tractor, of a rearwardly extending arched member with its arms pivotally connected to the axle structure on a transverse axis, means on the tractor for adjustably supporting said arched member, a cross bar connecting the arms of the arched member and formed with substantially upright arched portions located at each side of the central longitudinal line of the tractor and with a central horizontal portion connecting the arched portions, horizontal pivot members at each end of the cross-bar in alignment with said central horizontal portion, means for securing the cross-bar and pivot members to the arms of the arched member, trailing tool beams pivoted on the central portion of the cross-bar and on each pivot member, and yieldable supporting connections between the rear portion of the arched member and each tool beam.

3. The combination with a row crop tractor having a rear axle structure comprising an axle housing, depending housings at each end thereof and traction wheels mounted on the outer sides of the depending housings, of a rearwardly extending arched member with its arms pivotally connected on the inner sides of the depending housings of the axle structure, resilient suspension elements connecting the arched member with the axle structure, means on the tractor for lifting and lowering the arched member including a lost motion connection, means on the arms of the arched member for connection of tool beams, trailing tool beams connected to said means in laterally spaced relation, and supporting connections between the rear portion of the arched member and each tool beam.

4. The combination with a row crop tractor having a rear axle structure comprising an axle housing, depending housings at each end thereof and traction wheels mounted on the outer sides of the depending housings, of a rearwardly extending arched member with its arms pivotally connected on the inner sides of the depending housings of the axle structure, means on the tractor for lifting and lowering the arched member, a depending bracket secured to each arm of the arched member adjacent its pivot on the axle structure, a trailing tool beam pivoted to the lower end of each bracket, and yieldable supporting connections between the rear portion of the arched member and each of said tool beams.

5. The combination with a row crop tractor having a rear axle structure comprising an axle housing, depending housings at each end thereof and traction wheels mounted on the outer sides of the depending housings, of a rearwardly extending arched member with its arms pivotally connected on the inner sides of the depending housings of the axle structure, means on the tractor for lifting and lowering the arched member, a depending bracket secured to each arm of the arched member adjacent its pivot on the axle structure, a cross-bar extending between the arms of the arched member and having its ends secured to said brackets, said cross-bar being formed with substantially upright arched portions located at each side of the central longitudinal line of the tractor and with a central horizontal portion connecting the arched portions, trailing tool beams pivoted on the central horizontal portion of the cross-bar and to the lower ends of said brackets, and yieldable supporting connections between the rear portion of the arched member and each tool beam.

6. The combination with the rear axle structure of a tractor, of an upwardly yieldable supporting frame pivoted to the axle structure and extending rearwardly, a member extending across the forward portion of said frame and formed with a plurality of upright arches, a plurality of trailing tool beams connected to the said member on transverse pivots at each side of said arches, and upwardly yieldable connections between said beams and the rear portion of the frame.

ALEXUS C. LINDGREN.